Dec. 3, 1935.  W. A. HAYSSEN  2,022,911
CONVEYER MECHANISM FOR MACHINES FOR HANDLING BREAD
Original Filed Oct. 27, 1932    3 Sheets-Sheet 3
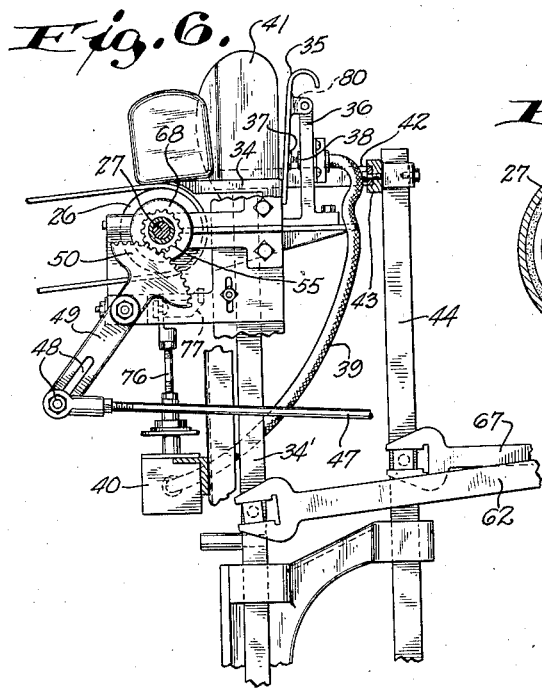
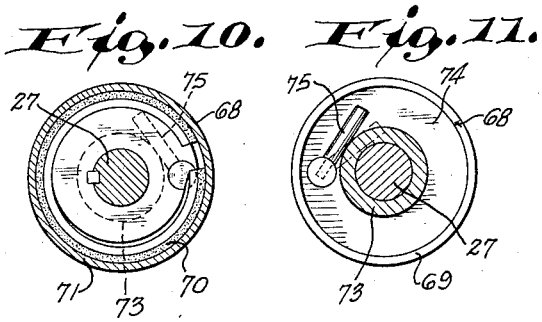
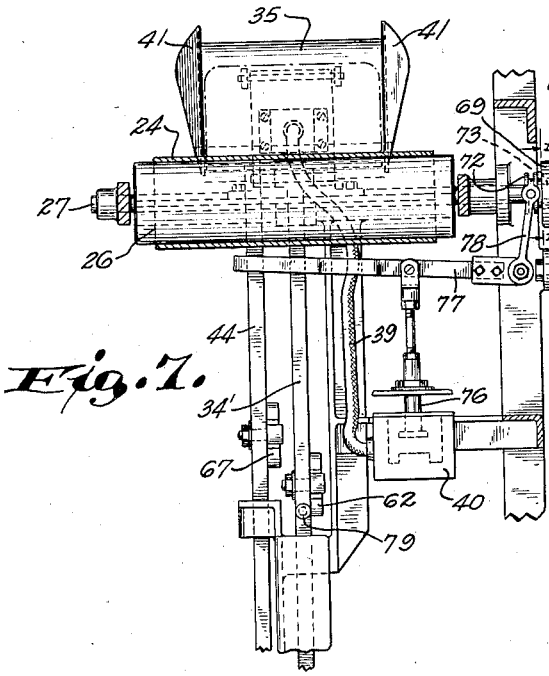
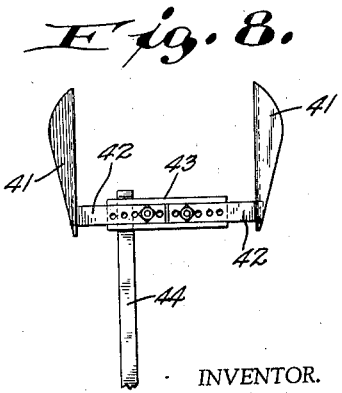
INVENTOR.
William A. Hayssen,
BY Morsell, Lieber & Morsell
ATTORNEYS.

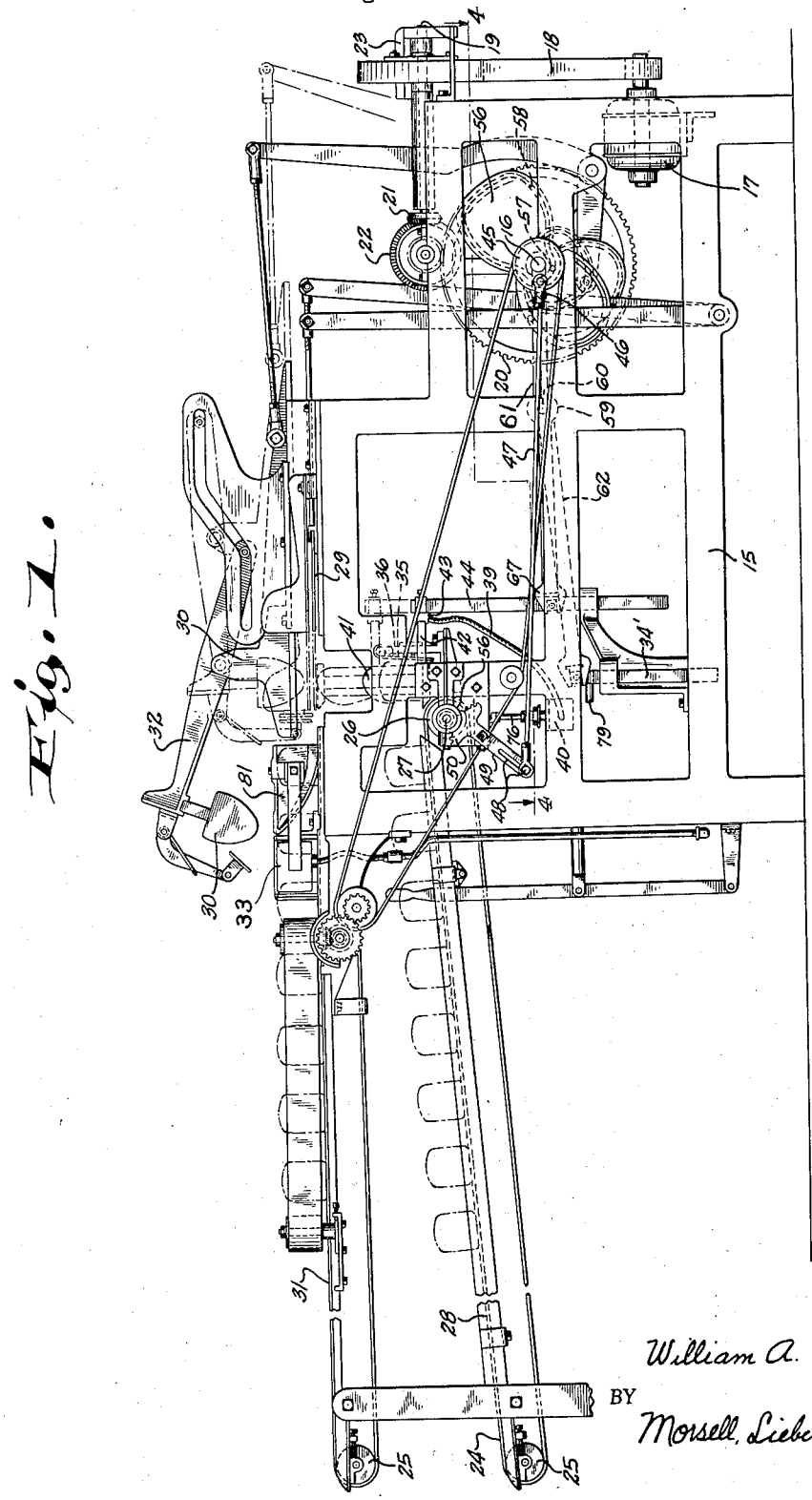

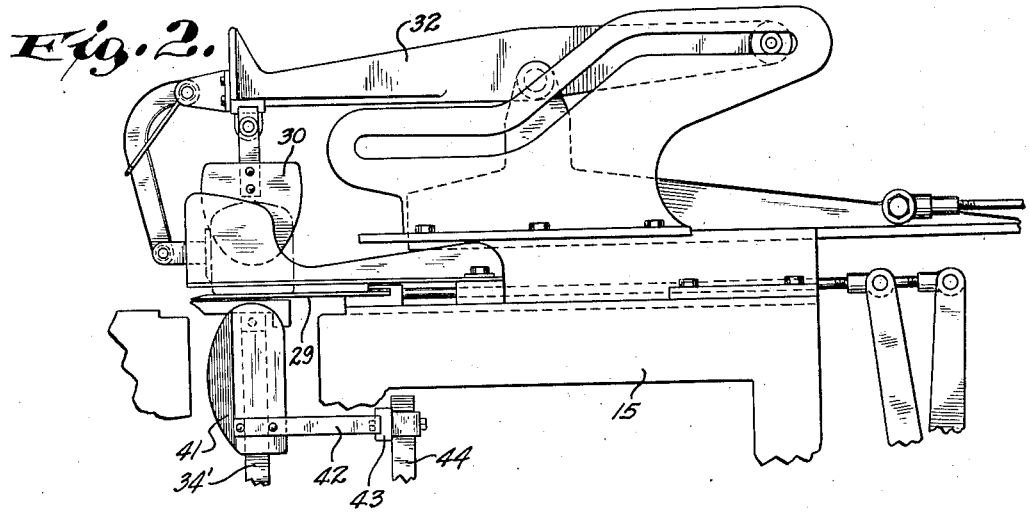
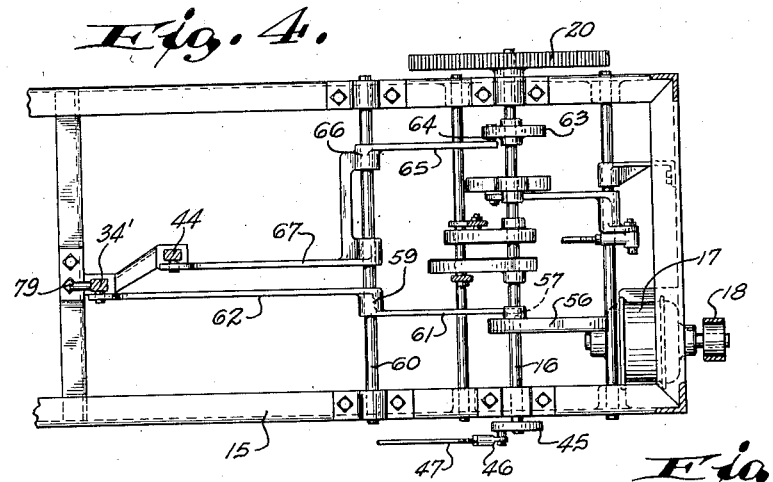
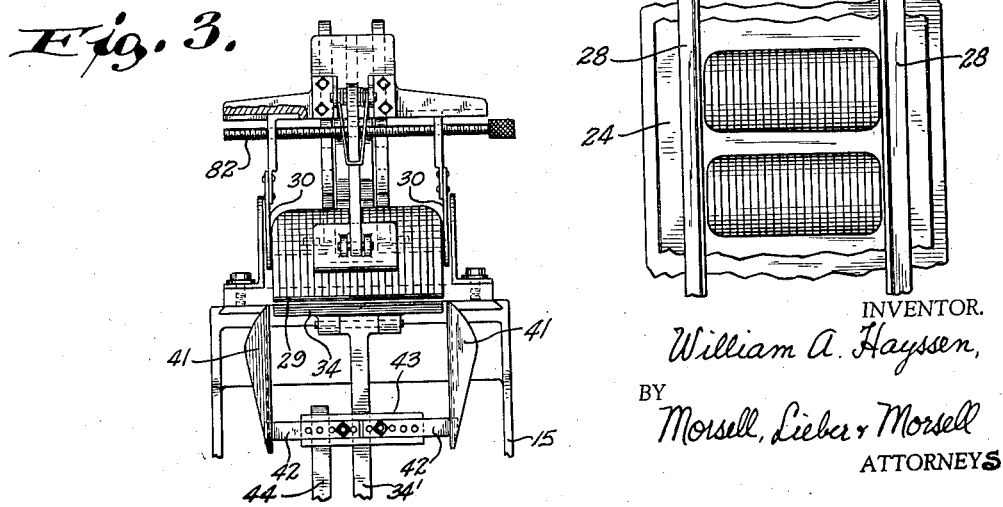
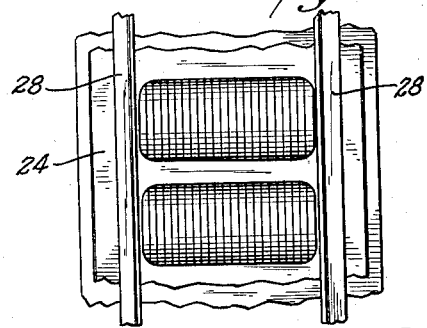

Patented Dec. 3, 1935

2,022,911

UNITED STATES PATENT OFFICE 2,022,911

CONVEYER MECHANISM FOR MACHINES FOR HANDLING BREAD

William A. Hayssen, Sheboygan, Wis.

Original application October 27, 1932, Serial No. 639,763. Divided and this application September 22, 1934, Serial No. 745,120

3 Claims. (Cl. 198—20)

This invention relates to improvements in conveyer mechanisms particularly adapted for use with machines for handling and wrapping loaves of sliced bread, and is a division of application Serial No. 639,763, filed October 27, 1932, issued as Patent #1,977,307, October 16, 1934.

Machines are on the market for automatically wrapping unsliced loaves of bread, but in recent years a market for sliced loaves of bread has developed, and due to the fact that a sliced loaf must be maintained intact, it has been impossible to wrap these sliced loaves on a standard machine unless the individual loaves be disposed in cardboard trays for the purpose of maintaining the slices in juxtaposition and the loaves intact, and the wrapping material encloses the tray as well as the sliced loaf therein. Obviously, where the sliced loaves are wrapped in trays, there is the additional cost of the trays as well as the handling of the same; and the final package is less neat and attractive than is a trayless package.

It is therefore the primary object of the present invention to provide mechanism, including a conveyer, which may be incorporated with a bread wrapping machine to adapt said machine to the handling and wrapping of loaves of sliced bread, without the use of trays, and which will maintain the slices of a loaf in juxtaposition and the loaf intact while being moved by the conveyer during elevation of the loaf from the conveyor to the wrapping mechanism and during the wrapping operations.

A further object of the invention is to provide, in a bread wrapping machine, a novel form of conveyer belt for carrying sliced, unwrapped loaves, and arranged to cooperate with adjustable side rails to accommodate sliced loaves of any length between certain limits.

In bread wrapping machines, the loaves of bread are fed from a conveyer to an elevator in the mechanism, which elevator raises the individual loaves to the wrapping mechanism. The drive for the conveyer is such that an intermittent motion is imparted to the conveyer. It is a further object of the invention to provide a novel form of automatic clutch mechanism in connection with the conveyer drive and elevator whereby the conveyer is caused to stop immediately upon depositing a loaf of bread on the conveyer and the conveyer remains stationary until the elevator has completed its operation and is again in lowered position ready to receive another loaf of bread, whereby any possibility of a loaf being delivered below the elevator, or while the elevator is in operation, is obviated.

A further object of the invention is to provide, in a bread wrapping machine, mechanism associated with the loaf elevator for maintaining a sliced loaf intact, said mechanism being readily adjustable to accommodate sliced loaves of various lengths.

A further object of the invention is to provide sliced loaf handling mechanism with which a standard bread wrapping machine may be readily equipped with a minimum of effort and expense.

A further object of the invention is to provide a machine for wrapping loaves of sliced bread which is of very simple construction, is strong and durable, is automatic in its operation, and is well adapted for the purposes described.

With the above and other objects in view, the invention consists of the improved conveyer mechanism for a sliced bread loaf wrapping machine, and its parts and combinations as set forth in the claims, and all equivalents thereof.

In the accompanying drawings, in which the same reference characters indicate the same parts in all of the views:

Fig. 1 is a side view of a machine for automatically wrapping loaves of bread equipped with mechanism for handling sliced loaves;

Fig. 2 is an enlarged, fragmentary, side view of portions of the elevator, wrapping, and loaf-removing mechanism;

Fig. 3 is a front view of the parts shown in Fig. 2;

Fig. 4 is a horizontal, sectional view indicated on line 4—4 of Fig. 1;

Fig. 5 is a fragmentary, plan view of the incoming conveyer belt and the adjustable side rails thereabove;

Fig. 6 is an enlarged, fragmentary, side view of the elevator, sliced loaf holding member, the conveyer drive, and the automatic clutch control therefor;

Fig. 7 is a front view of the showing in Fig. 6 with the conveyer belt and other parts shown in section.

Fig. 8 is an enlarged, front view of the sliced loaf holding member which cooperates with the elevator;

Fig. 9 is an enlarged, detail, sectional view of the clutch mechanism taken on line 9—9 of Fig. 7; and Figs. 10 and 11 are enlarged, detail, sectional views of the clutch mechanism taken on lines 10—10 and 11—11 respectively in Fig. 7.

Heretofore, automatic wrapping machines for bread have only been adapted for the wrapping of whole (unsliced) loaves. Slicing machinery has recently been developed for slicing bread in the bakery before delivery to the retail outlets. Sliced bread has met with considerable favor, as it is a convenience to the consumer. In order to successfully market sliced bread, it is necessary that the loaves of sliced bread be wrapped just as loaves of whole bread were wrapped. Heretofore, unless trays were utilized, wrapping machines have not been able to handle loaves of pre-sliced bread, for the reason that the slices of the loaves could not be successfully held together while the loaves were being operated on in the wrapping and folding mechanisms of the machine.

Referring now more particularly to the drawings, it will be observed that Fig. 1 illustrates a bread wrapping machine equipped with mechanism to adapt it to the handling of pre-sliced bread loaves, without the use of trays, the machine being further provided with improved clutch and control devices to increase the efficiency of the conveyer, elevator, and sliced loaf holding mechanisms. In general, the machine includes a frame 15 in a lower portion of which is transversely journaled a cam shaft 16 which is driven from a variable speed electric motor 17 through a belt drive 18 which turns a shaft 19 by which power is imparted to a large gear 20 fast on the cam shaft through a pair of meshing reduction gears 21 and 22. Associated with said drive arrangement is a conventional form of clutch 23 in order to start and stop the entire machine.

Extending longitudinally with respect to the front end of the frame is an incoming loaf conveyer belt 24 which extends about a pair of spaced-apart rollers 25 and 26, the roller 25 being an idler and the roller 26 being driven and being fast on a driven and controlled shaft 27. In practice the outer end of the conveyer 24 connects with a slicing machine (not shown), so that the bread loaves carried along the conveyer 24 and shown in broken lines in Fig. 1 are sliced. The loaves are held intact and the slices adjacent one another by adjustable side rails 28. Said side rails lightly contact with the ends of the loaves and prevent the slices from separating endwise from the loaves. The conveyer belt 24 is integral and of a width sufficient to take a loaf of the longest standard length, so that regardless of the adjustment of the rails 28, material of the belt will be therebelow to support the sliced loaves which are confined between the rails.

The incoming loaf conveyer feeds into the machine intermediate the height of the frame 15. Disposed above the inner end of the conveyer 24 on the upper portion of the frame is bread wrapping mechanism which includes a knife (not shown) for cutting waxed wrapping paper in desired lengths upon delivery of loaves to a proper position, paper folding instrumentalities 30, and an arm 32 for removing wrapped loaves and positioning the same on an upper, outgoing conveyer 31. At the inner end of said conveyer 31, each wrapped loaf passes between a pair of heating units 33 which seal the end flaps of the wrapping paper.

In order to elevate and deliver, at desired periods, individual loaves of bread from the inner end of the incoming conveyer 24 to the above-mentioned mechanisms, an elevator is provided which includes a flat supporting plate 34, and a vertically movable bar 34' rigidly carrying said plate at its upper end. Adapted to cooperate wtih the elevator in its lowered position is a switch plate 35 hingedly carried by a fixed bracket 36 secured to the frame 15 and positioned so as to be adjacent the rear edge of the elevator plate 34 when the latter is in lowered position. As will later be described more in detail, said switch plate has a contact 37 adapted to engage a contact 38 on the bracket 36 to close an electric circuit 39 which includes a solenoid 40.

To maintain a sliced loaf on the elevator plate 34 so as to prevent separation of the slices of the loaf and to hold the loaf intact, ready for wrapping, a pair of end wings 41 are provided. As shown best in Fig. 8, said wings are carried vertically by the outer ends of L-shaped arms 42 which are adjustably secured to the upper end portion of a vertically movable, reciprocal wing bar 44. The bar 44 is supported by and guided in suitable brackets extending from the frame.

As previously mentioned, the shaft 16 is a driven shaft, and fast on the end of said shaft is a crank disc 45 carrying a crank 46 to which the end of a connecting rod 47 is secured. The other end of the connecting rod has a pin and slot connection 48 with the lower end portion of a medially, pivotally mounted segment lever 49. On the upper end portion of said lever there is formed a gear segment 50. It will therefore be evident that an oscillatory movement is imparted to the gear segment 50 and it is intended that this oscillatory movement be utilized to turn the driven conveyer shaft 27 intermittently in the same direction to intermittently advance the conveyer 24. To this end a portion of the shaft 27 has mounted thereon a one-way clutch 56 of the type having rollers 51 to cooperate with the bore of a casing 52 surrounding the shaft 27. A pinion 55 is secured to the casing 52 which becomes the oscillating driver. The rollers 51 are cooperable wtih external wedge surfaces 53 formed on a member 54 and said latter member is intermittently driven by the casing 52. The member 54 is connected, by means of the bore of the pinion 55, to a casing 71 which becomes the driver of a second clutch mechanism, as will later appear.

The elevator bar 34' is periodically reciprocated vertically by means of an elevator cam 56 fast on the drive shaft 16. As before mentioned, the forward movement of the conveyer 24 is intermittent, and due to the segment and clutch arrangement previously described during one-half of the revolution of the crank disc 45 the conveyer moves forward a predetermined distance, while during the other half of the revolution of said crank disc the conveyer is stationary. The elevator cam 56, consequently, is so shaped that during periods of movement of the conveyer 24 the elevator is in lowered position, but when the conveyer is idle, the shape of the cam 56 causes the elevator to rise to its highest position shown in Figs. 2 and 3, and to then drop again to normal lowered position. The connections between said cam 56 and the elevator bar 34' for moving said elevator include a pin 57 adapted to ride in an eccentric groove 58 in said cam 56, and a crank having its medial hub portion 59 pivotally mounted on a supporting shaft 60 with a pair of arms 61 and 62 extending angularly in opposite directions therefrom, the outer end of the arm 61 carrying the cam pin 57 and the outer end portion of the arm 62 having a forked engagement with the elevator bar 34' to move the same.

The reciprocal wing carrying bar 44 is also operated from the drive shaft 16 by means of a cam 63 fast on said shaft. (See Fig. 4.) Said cam, through a pin connection 64, reciprocates the arm 65 of a lever 66, pivotally mounted on the shaft 60. The other arm 67 of said lever has a forked connection with the lower end portion of the wing carrying bar 44. The cam 63 is so shaped that it will cause the wing carrying bar 44 to rise at the same time upward movement of the elevator bar 34' commences, and the wing carrying bar will be raised at the same speed to its highest position which is shown in Fig. 3, but said bar 44 will lower in advance of the lowering of the elevator.

The mechanism is so designed that upon one complete revolution of the cam or drive shaft 16, there will be one complete operation of the machine, i. e., a sliced loaf of bread will be delivered from the conveyer to the lowered elevator, the elevator and end wings will rise, the loaf will be wrapped and deposited onto the outgoing conveyer, and the end wings will lower to normal position, and then the elevator will lower ready for a subsequent loaf. The drive for the conveyer 24 is such that said conveyer ordinarily moves for a predetermined period and then is stationary for a predetermined period. In actual practice loaves are not disposed uniformly on the conveyer, and, hence, means are provided to automatically stop the conveyer upon the deposit of a loaf on the elevator; and this is irrespective of the normal drive of the conveyer. Said means comprise the switch plate 35 adjacent the rear of the elevator, the solenoid 40, and a second clutch 68 on the conveyer driving shaft 27. Said clutch 68 is shown in detail in Figs. 10 and 11. The shaft to be driven, the conveyer shaft 27, is keyed to a clutch casing 69. Said clutch portion 69 is provided with an extension formed with an expansible clutch drum 70 which extends into a cupped casing 71. The cupped casing 71 loosely surrounds a portion of the shaft 27 and is fast with respect to the intermittently driven portion 54 of the one-way clutch 56, previously described. The shaft 27 also has loosely mounted thereon a grooved collar 72 having a tapered boss portion 73 adapted to shiftably extend into a recess 74 in a face of the casing 69. When said boss portion 73 is in position within the recess it urges and holds a spring-urged lever 75 in an outwardly directed position, as in Fig. 11. Said lever 75 is connected with the clutch drum 70 and, in the position mentioned, expands said clutch drum to cause it to tightly grip the inner side walls of the cupped casing 71, causing the clutch part 69 to be joined with the casing 71 to turn with is as a unit, and as the clutch part 69 is keyed to the conveyer shaft 27, the conveyer shaft is connected with the drive so as to be driven. However, if the collar 72 be slipped on the shaft away from the clutch portion 69 (to the left in Fig. 7), the boss 73 will release the lever 75 whereby the lever will move to the dotted-line position in Fig. 11 and the clutch drum will contract, releasing the engagement between the clutch parts 69 and 71, whereby the clutch part 69 will not be turned, and the shaft 27, in keyed connection therewith, will then be stationary.

When a loaf of bread is deposited from the conveyer 24 onto the elevator plate 34, it is necessary, as before pointed out, that the conveyer stop, in order that the movement of subsequent loaves be delayed. Hence, upon movement of a loaf onto said elevator plate it engages the switch plate 35 and pushes it in so as to close the circuit, through the cable 39, to the solenoid 40. The solenoid is then energized whereby a solenoid plunger 76 is pulled downwardly. This downward movement of the solenoid plunger will lower a pivotally mounted lever 77, which carries the solenoid plunger; and a finger 78, projecting angularly from an end of the lever and having a free end engaged in the groove of collar 72, will throw said collar to the left on the shaft 27 (with respect to Fig. 7) whereby the clutch lever 75 will be released and the stoppage of the conveyer shaft 27 will be effected. By reference to Fig. 7 it will be noted that the inner end of the lever 77 is secured to the finger 78 and it is also pivotally connected with a portion of the frame of the machine. Upon cessation of the conveyer movement the loaf elevator and the wing carrying bar will move upwardly. Near the upward limit of movement of the elevator a pin 79 projecting from the elevator bar 34' engages under the pivotal lever 77 and raises said lever whereby the solenoid plunger 76 is raised from the solenoid and the clutch is then engaged. Thereafter when the end wings have lowered and the elevator has next lowered the parts are ready for subsequent operations. It should be understood that the energization of the solenoid is only temporary inasmuch as the switch plate bracket 36 is stationary and as soon as the elevator rises, the bread loaf moves away from the switch plate 35 and a spring 80 urges said switch plate outwardly to open the circuit.

In the operation of the improved wrapping machine for sliced bread loaves the motor 17 is set into operation to drive the cam shaft 16. Loaves of sliced bread are progressively delivered onto the outer end of the incoming conveyer belt 24 from a slicing machine, and due to the drive previously described, said conveyer advances intermittently. As soon as a sliced loaf is delivered onto the lowered elevator plate 34, cessation of the conveyer movement is assured, by means of the switch plate and clutch 68 and the ends of the loaf are engaged by the wings 41 to prevent separation of the slices of the loaf. The elevator then rises to elevate the loaf and the wing carrying bar 44 also rises simultaneously to a point below the upper limit of movement of the elevator to maintain the loaf intact. At this point, the arms 32 having been moved to a lowered position, the side members 30 thereof engage wrapping paper and fold in around and engage the ends of the loaf above the wings 41, and the wings commence to move downwardly. Upon the elevator reaching its upper position a reciprocal plate 29 is projected between the bottom of the loaf, and the elevator and the wrapping paper is also brought below the loaf. The elevator then lowers, and the wrapping mechanism completes the wrapping of the sliced loaf; and then the arms 32 are moved outwardly, upwardly to deposit the wrapped loaf on the upper, outgoing conveyer 31 where it passes first between a pair of ironers 81 for pressing the end flaps of the wrapper tightly in place, and then between heating units 33 which seal the end flaps. The wrapped loaves are finally delivered from the conveyer into containers.

From the foregoing description it will be evident that the invention practically and efficiently adapts an automatic bread wrapping machine for the wrapping of sliced loaves. The full width conveyer belt 24 will receive sliced loaves of any standard length without the danger of slices separating and falling therefrom, and upon delivery of a sliced loaf to the elevator, the ends of the loaf are engaged and the loaf is held intact until the upper wrapping and folding mechanism comes into action and engages the ends of the loaf. As seen from Fig. 3, the upper instrumentalities are adjustable on the screw rod 82, and the wings 41 may be adjusted with respect to one another on the supporting plate 43, whereby these instrumentalities may likewise be adjusted to the length of the loaf. The wing carrying member 43 is also vertically adjustable on its reciprocal supporting bar 44. In addition to the aforementioned features, the incorporation of the second clutch mechanism 68 is especially advantageous as said clutch is automatically controlled and insures an arrest in the movement of the incoming conveyer every time a loaf is elevated for wrapping, and by this arrangement, regardless of the disposition and spacing arrangement of the loaves on the incoming conveyer, no loaf will ever be delivered to the elevator until the preceding loaf has been wrapped and the elevator is in position to receive the next loaf. The improved conveyer mechanism for a machine for wrapping loaves of sliced bread is, in addition, of simple and novel construction, automatic in its operation, and is well adapted for the purposes set forth.

What is claimed as the invention is:

1. In an automatic bread wrapping machine, an incoming conveyer adapted to carry loaves, means for advancing said conveyer intermittently, a reciprocal member for carrying individual loaves away from the conveyer, means for reciprocating said reciprocal member during idling periods of the conveyer, and additional means controlled by the deposit of a loaf on said reciprocal member for automatically arresting movement of the conveyer.

2. In an automatic bread handling machine, an incoming movable conveyer adapted to carry loaves, means for advancing said conveyer intermittently, a reciprocal member for carrying individual loaves away from the conveyer, means for reciprocating said reciprocal member, and independent means for automatically arresting movement of the conveyer immediately upon the deposit of a loaf from said conveyer onto said loaf receiving member and to maintain the conveyer arrested during a single reciprocation of said loaf receiving member, said means operating independently of the means for advancing the conveyer intermittently and irrespective of moving or idling periods of said conveyer.

3. In an automatic bread handling machine, an incoming movable conveyer adapted to carry loaves, means for intermittently advancing said conveyer, a reciprocal individual loaf receiving member adjacent a portion of the conveyer to receive individual loaves therefrom, means independent of the conveyer advancing means for automatically arresting movement of the conveyer immediately upon the deposit of a loaf from said conveyer onto said reciprocal member, and means for reciprocating said last-mentioned member during the functioning of said conveyer movement arresting means.

WILLIAM A. HAYSSEN.